US009306686B2

(12) United States Patent
McIntyre et al.

(10) Patent No.: US 9,306,686 B2
(45) Date of Patent: Apr. 5, 2016

(54) AUDIENCE RESPONSE COMMUNICATION SYSTEM

(71) Applicant: Macmillan New Ventures, LLC, New York, NY (US)

(72) Inventors: James E. McIntyre, Indianapolis, IN (US); John W. Sawyer, Indianapolis, IN (US)

(73) Assignee: Macmillan New Ventures, LLC, New York, NY (US)

( * ) Notice: Subject to any disclaimer, the term of this patent is extended or adjusted under 35 U.S.C. 154(b) by 36 days.

(21) Appl. No.: 14/268,743

(22) Filed: May 2, 2014

(65) Prior Publication Data
US 2015/0318938 A1 Nov. 5, 2015

(51) Int. Cl.
H04M 3/42 (2006.01)
H04H 60/33 (2008.01)
H04L 1/08 (2006.01)

(52) U.S. Cl.
CPC . H04H 60/33 (2013.01); H04L 1/08 (2013.01)

(58) Field of Classification Search
CPC .............................. H04W 28/04; H04W 52/48
USPC ........................................................ 455/416
See application file for complete search history.

(56) References Cited

U.S. PATENT DOCUMENTS

| 3,858,212 A | 12/1974 | Tompkins et al. |
| 5,002,491 A | 3/1991 | Abrahamson et al. |
| 5,241,691 A | 8/1993 | Owen |
| 6,021,119 A | 2/2000 | Derks et al. |
| 6,865,609 B1 | 3/2005 | Gubbi et al. |
| 7,280,836 B2 | 10/2007 | Fuccello et al. |
| 7,420,952 B2 | 9/2008 | da Costa et al. |
| 7,502,855 B2 | 3/2009 | Swanson et al. |
| 7,570,612 B1 | 8/2009 | Loc et al. |
| 7,630,713 B2 | 12/2009 | Cromer et al. |
| 7,653,163 B2 | 1/2010 | Sadri et al. |
| 7,710,930 B2 | 5/2010 | Kwak |
| 7,715,780 B1 | 5/2010 | Beamish et al. |
| 7,739,705 B2 | 6/2010 | Lee et al. |
| 7,855,985 B2 | 12/2010 | Kwon |
| 7,929,500 B2 | 4/2011 | Hur et al. |
| 7,970,351 B2 | 6/2011 | Jabara et al. |

(Continued)

FOREIGN PATENT DOCUMENTS

| CN | 101491143 | 7/2009 |
| EP | 0526979 | 2/1993 |

(Continued)

OTHER PUBLICATIONS

"A Multi-Channel MAC Protocol for Ad Hoc Wireless Networks"; http://citeseerx.ist.psu.edu/viewdoc/download?doi=10.1.1.2.2797&rep=rep1&type=pdf; So, et al., Jan. 2003.

(Continued)

*Primary Examiner* — Tu X Nguyen
(74) *Attorney, Agent, or Firm* — Olson & Cepuritis, Ltd.

(57) ABSTRACT

The present invention is directed to an audience response communication system comprising a base unit and a plurality of remote input devices. The audience response and communication system lowers the risk of undelivered data transmissions by enabling the remote input devices to sequentially transmit responses via multiple transmission channels until a vote acknowledgement message is received, or a predetermined number of attempts is made.

20 Claims, 6 Drawing Sheets

(56) References Cited

U.S. PATENT DOCUMENTS

| | | |
|---|---|---|
| 8,023,441 B2 | 9/2011 | Werb et al. |
| 8,121,101 B2 | 2/2012 | Kalogridis et al. |
| 8,125,952 B2 | 2/2012 | Sampath et al. |
| 8,150,380 B2 | 4/2012 | Adkins |
| 8,228,849 B2 | 7/2012 | Trachewsky |
| 8,265,543 B2 | 9/2012 | Knowles et al. |
| 8,335,503 B1 | 12/2012 | Desmond et al. |
| 8,483,155 B1 | 7/2013 | Banerjea et al. |
| 8,503,377 B2 | 8/2013 | Cordeiro et al. |
| 8,503,473 B2 | 8/2013 | Kwon |
| 8,514,789 B2 | 8/2013 | Akchurin et al. |
| 2003/0223554 A1 | 12/2003 | Zhang |
| 2005/0058114 A1 | 3/2005 | Santhoff et al. |
| 2006/0009229 A1 | 1/2006 | Yuan et al. |
| 2006/0063490 A1 | 3/2006 | Bader et al. |
| 2006/0171304 A1 | 8/2006 | Hill et al. |
| 2006/0204944 A1 | 9/2006 | Preskill |
| 2006/0205349 A1 | 9/2006 | Passier et al. |
| 2006/0218572 A1 | 9/2006 | Thielman et al. |
| 2006/0293048 A1 | 12/2006 | Swanson et al. |
| 2007/0281634 A1 | 12/2007 | Rao et al. |
| 2007/0283379 A1 | 12/2007 | Earl |
| 2008/0108298 A1* | 5/2008 | Selen et al. .................. 455/2.01 |
| 2010/0178645 A1 | 7/2010 | Ieperen et al. |
| 2010/0203892 A1 | 8/2010 | Nagaraja et al. |
| 2010/0281287 A1 | 11/2010 | Doerksen et al. |
| 2010/0315994 A1 | 12/2010 | Lam |
| 2011/0087523 A1* | 4/2011 | Earl .................................. 705/12 |
| 2011/0142028 A1 | 6/2011 | Kasslin et al. |
| 2011/0244953 A1 | 10/2011 | Pekau et al. |
| 2011/0299428 A1 | 12/2011 | Cacioppo et al. |
| 2012/0120871 A1 | 5/2012 | Jaeger |
| 2012/0263090 A1 | 10/2012 | Porat et al. |
| 2012/0310394 A1 | 12/2012 | El-Hoiydi |
| 2012/0315839 A1 | 12/2012 | Mumcuoglu et al. |
| 2013/0028293 A1 | 1/2013 | Makh et al. |
| 2013/0229996 A1 | 9/2013 | Wang et al. |

FOREIGN PATENT DOCUMENTS

| | | |
|---|---|---|
| EP | 1207654 | 5/2002 |
| EP | 1337127 | 8/2003 |
| WO | WO2004003810 | 1/2004 |
| WO | WO2013149189 | 10/2013 |

OTHER PUBLICATIONS

"Multi-Channel Scheduling Protocol for Wireless Personal Area Networks IEEE802.15.4"; http://www.jscse.com/papers/vol3.no5/vol3.no5.1.pdf; Sahraoui, et al.; May 25, 2013.

"IEEE 802.22: An Introduction to the First Wireless Standard based on Cognitive Radios"; http://www.ojs.academypublisher.com/index.php/jcm/article/viewFile/01013847/86; Cordeiro, et al., Apr. 1996.

* cited by examiner

| Frame (Channel 1) | Frame (Channel 2) | Frame (Channel 3) | Frame (Channel 1) | Frame (Channel 2) |

FIG. 6

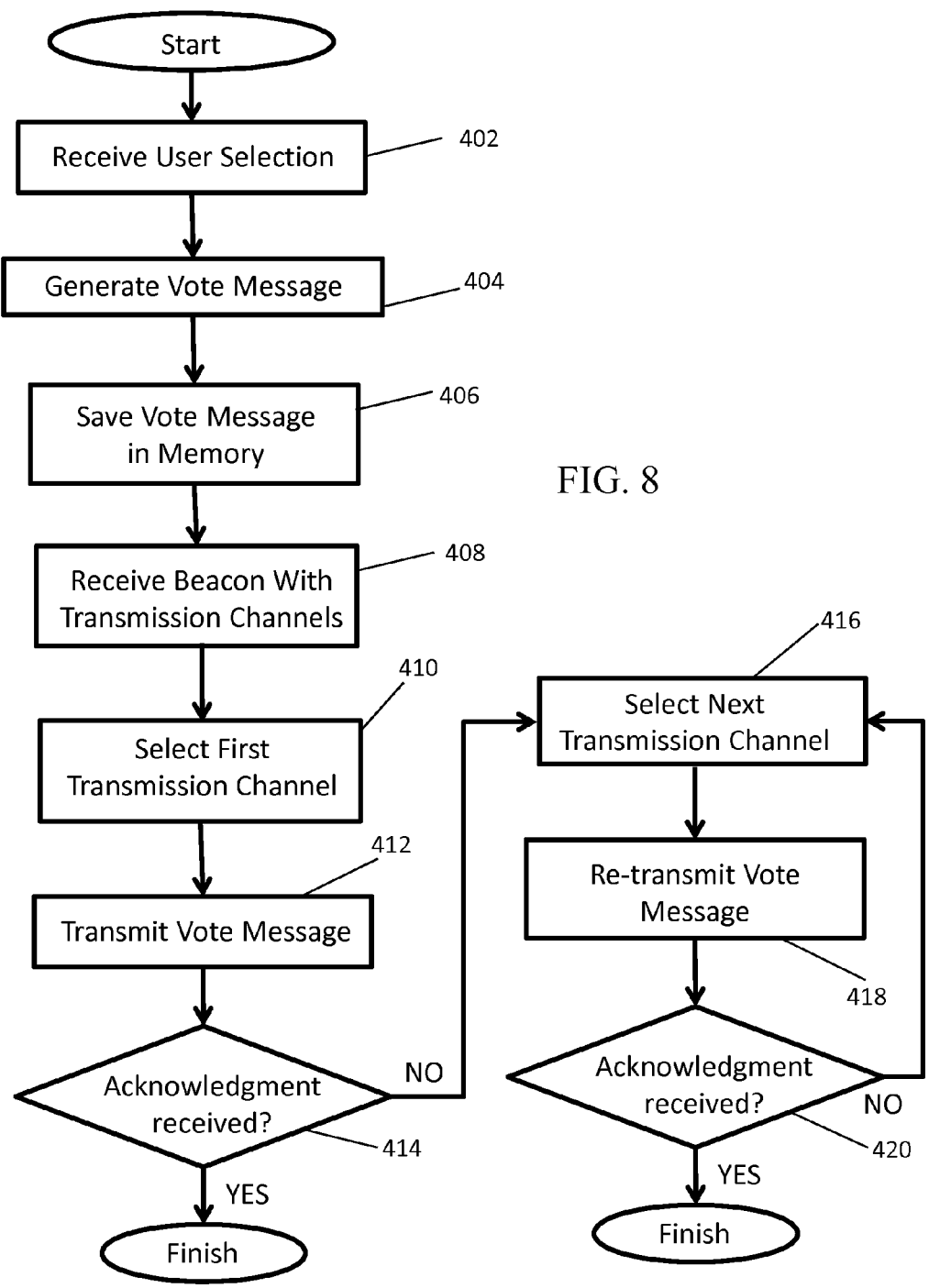

AUDIENCE RESPONSE COMMUNICATION SYSTEM

FIELD OF THE INVENTION

This invention relates to an audience response communication system, and in particular, to a wireless communication method that allows for efficient data transfer between a base unit and remote units with less risk of undelivered transmissions.

BACKGROUND OF THE INVENTION

Audience response systems enable groups of people, such as meeting participants, students, or audience members to wirelessly vote on a topic or respond to questions submitted by a host, instructor, or presenter. Different audience response systems are known and have been used in numerous applications including education, audience participation, game shows, voting at conferences, opinion polls, and the like.

Various audience response systems include one or more base station RF transceivers. These base stations or units may be connected to a computer that may execute audience response system software. The base stations may also be adapted to communicate with several wireless keypads or other remote input devices adapted to enable a user to select a response to an inquiry. The base station transmits data inviting a response from the remote input devices. Audience members enter their responses to a question posed by the presenter by using their input devices. The audience responses are then communicated to the base station. The responses may then be stored, tallied, and/or displayed using the audience response system software.

Various transmission protocols, such as Wi-Fi, Cellular, wiMax, and Bluetooth are known in the art. All wireless transmissions operate within frequencies of the radio spectrum of the electromagnetic spectrum that are available for communication. These frequencies are treated as a public resource and are regulated by national organizations such as the Federal Communications Commission in the United States, or Ofcom in the United Kingdom. These agencies determine which frequency ranges can be used for what purpose and by whom. Wireless communication spans the spectrum from 9 kHz to 300 GHz. For example, Wi-Fi is a common wireless local area network using microwaves in the 2.4 GHz and 5 GHz bands that enables portable computing devices to connect easily to the Internet. Wi-Fi has become the de facto standard for access in private homes, within offices, and at public hotspots. Wi-Fi also allows communications directly from one device to another without an access point intermediary.

Because of the ubiquitous nature of radio transmissions, however, wireless transmissions often face problems with interference from other competing transmissions. For example, several other transmission protocols also operate within the operating frequencies of Wi-Fi including cordless telephones, baby monitors, Bluetooth devices, car alarms, and even microwave ovens. Due to this interference, an ongoing problem faced by audience response systems is the failure of message delivery between remote units and the base unit.

SUMMARY OF THE INVENTION

The present invention is a method that improves the reliability of message delivery in an audience response system through sequential transmissions across different frequencies within the broadcast spectrum.

Wireless communications typically include management and control information to support data transfer. A beacon sent from a base unit to a plurality of remote units enables a wireless system to maintain communications in an orderly fashion. The beacon may contain information about the network, and is transmitted by a base unit on a periodic basis. The time interval from the start of one beacon to the start of the next is called the beacon interval.

The most commonly used frequency range available to the public for wireless communication is the 2.4 GHz range. As discussed, several communication protocols including Wi-Fi, Bluetooth, ZigBee, and cordless telephony operate in this frequency range. Because of this, the likelihood that transmitted messages will collide with other messages, thus corrupting the data in the messages, is substantial. Re-transmission of a message is a method that has often been used to complete the transmission. However, the interfering message is also likely to be re-transmitted, and may cause interruption or corruption of the re-transmission.

According to one aspect of the present invention, a multi-frequency transmission system is utilized to avoid transmission interference. An audience response communication system may comprise a base unit and a plurality of remote input devices. The remote input devices and base unit are adapted to communication with one another wirelessly. The remote input units include a radio and processing unit that receives a message from the base unit that includes an indication of a plurality of channels to be used in a transmission from the remote input device to the base unit. For example, when the remote input unit has a message to be sent, it waits for a vote invitation message from the base unit, preferably made as part of a beacon. Alternatively, a dedicated vote invitation message can be sent. In the preferred embodiment, the beacon will include information regarding the multiple channels to be used for transmission. The remote unit will generate a response, which may be referred to generally as a vote message, although the response is not limited to votes, and will transmit the vote via a first identified channel. The remote unit will then wait for a vote acknowledgement message from the base unit. The vote acknowledgement message confirms to the remote input device that the message transmitted was received by the base unit.

If an acknowledgement is not received by the remote unit, it will re-transmit the message via a second identified channel. In some instances, the remote unit will wait a predetermined amount of time for an acknowledgement. In a preferred embodiment, an acknowledgement will be sent via a subsequent beacon. After re-transmitting, the remote unit will then wait again for a vote acknowledgement. If an acknowledgement is not received by the remote unit, it will re-transmit the message via a third identified channel. This process will continue as desired until either the message is transmitted and an acknowledgement received, or a predetermined number of attempts are exhausted. In a preferred embodiment, the re-transmission attempts will be made via a first, second, third, etc. channel, and then repeats the cycle a predetermined number of times. If the predetermined number of attempts are exhausted, the remote unit will generate an error indication.

As discussed, it is preferred that the base unit will incorporate acknowledgement messages as part of beacon transmissions, which are being sent periodically. A particular beacon may or may not include an acknowledgement message depending on whether the base unit has received a vote message. The beacon with the acknowledgement message is broadcast to all of the remote input devices; however, the acknowledgement message will include an identifier for the particular remote unit for which the acknowledgement message is intended, such as an address of the particular remote unit. Thus, although the beacon is being sent to all of the remote input devices, the acknowledgement message will only be processed by the remote input devices for which the acknowledgement is intended.

By transmitting vote messages or responses over different channels, the chances of colliding with a competing transmission are reduced. These and other objects, advantages and features of this invention will become apparent upon review of the following specification in conjunction with the drawings.

BRIEF DESCRIPTION OF THE DRAWINGS

FIG. 4 illustrates a preferred message frame of a base unit when the base is not receiving votes;

FIG. 5 illustrates a preferred message frame of a base unit when the base is receiving votes;

FIG. 6 depicts schematically the retransmission of vote messages;

FIG. 8 depicts a flowchart of processes of a remote input device.

DETAILED DESCRIPTION OF PREFERRED EMBODIMENTS

The detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
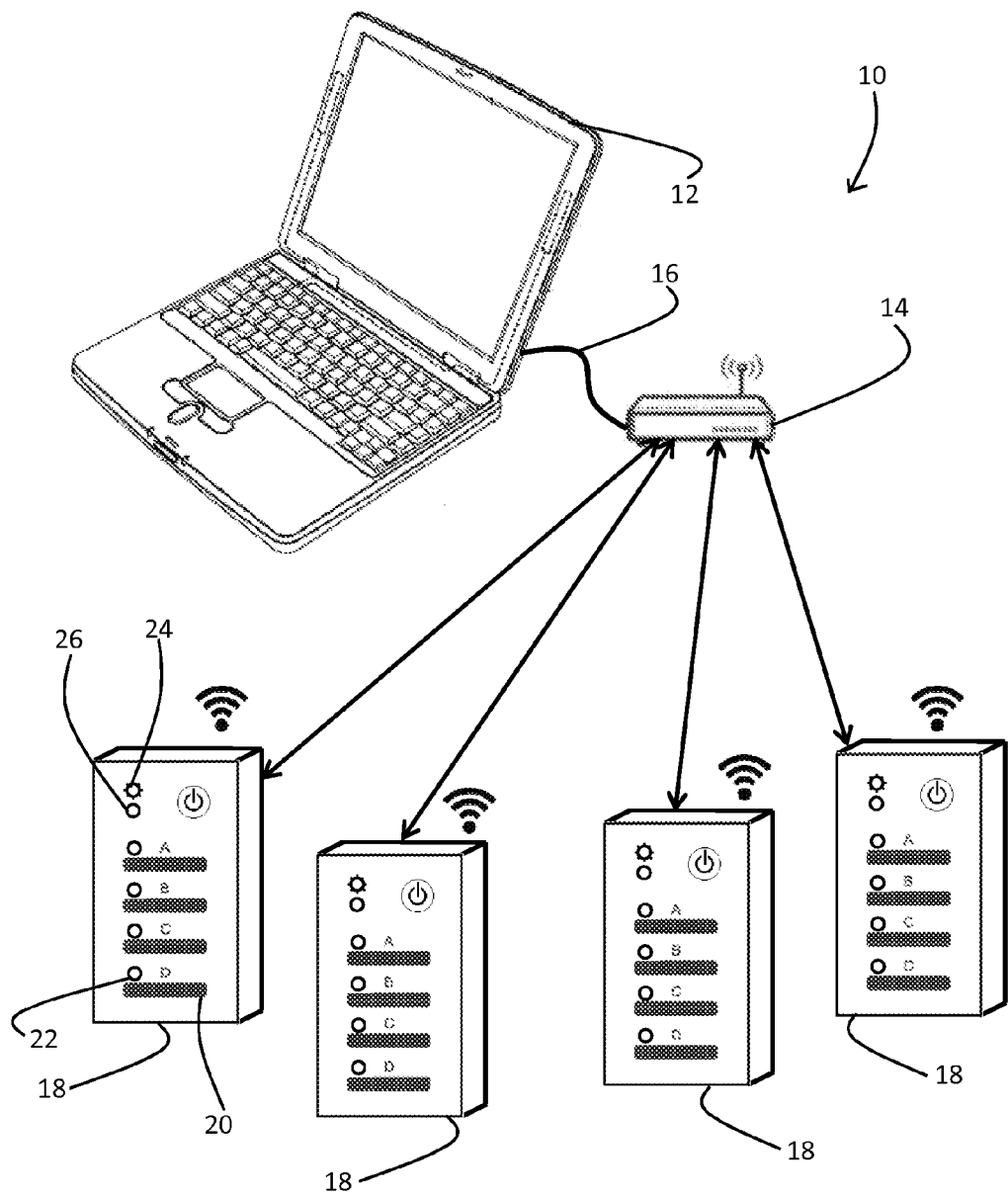
FIG. 1 illustrates an audience response communication system according to one embodiment of the present invention.

Referring to FIG. 1, a schematic of a preferred embodiment of a system according to the present embodiment is depicted. System 10 comprises a base unit, which in this embodiment comprises a computer 12 and a communication device such as wireless transceiver 14. While in this embodiment the computer 12 and wireless transmitter are connected by a USB connector 16, the base unit may be an integrated unit where the computer includes an internal wireless transceiver. The computer 12 may also include the software to operate the system in memory, or access such software via a wired network or a wireless connection, such as the Internet. Alternatively, the wireless transceiver 14 may be a wireless dongle that also includes the software run by the base unit. The computer 12 shown is a conventional laptop computer; however, any computing device adapted to run the appropriate software may be utilized, such as a desktop computer, smartphone, tablet computer, or the like.

Adapted to wirelessly communicate with the base unit are a plurality of remote input devices 18. Each of the plurality of remote input devices includes a communication device such as a transceiver that is adapted to communicate with transceiver 14 of the base unit.

Each of the plurality of remote input devices is configured to provide a user with a plurality of input options. In the embodiment shown, each of remote input devices 18 includes a plurality of pressable keys or buttons as the input options 20. As shown, in this embodiment, the user is provided with input options "A", "B", "C", and "D". Any number of input options, or configurations for the remote input device may be utilized. Each of the input options has an LED light 22 associated with it. In this embodiment, LED lights 24 and 26 are also provided to indicate that the remote input device is powered on and also to indicate device status. For example, light 24 may emit a green light to indicate that polling is open, while light 26 may emit a red light to indicate that polling is closed. LED lights 24 and 26 may also be adapted to flash to indicate lack of connection with the base unit. Other displays, such as an LCD, may also be used.

Figure 2:
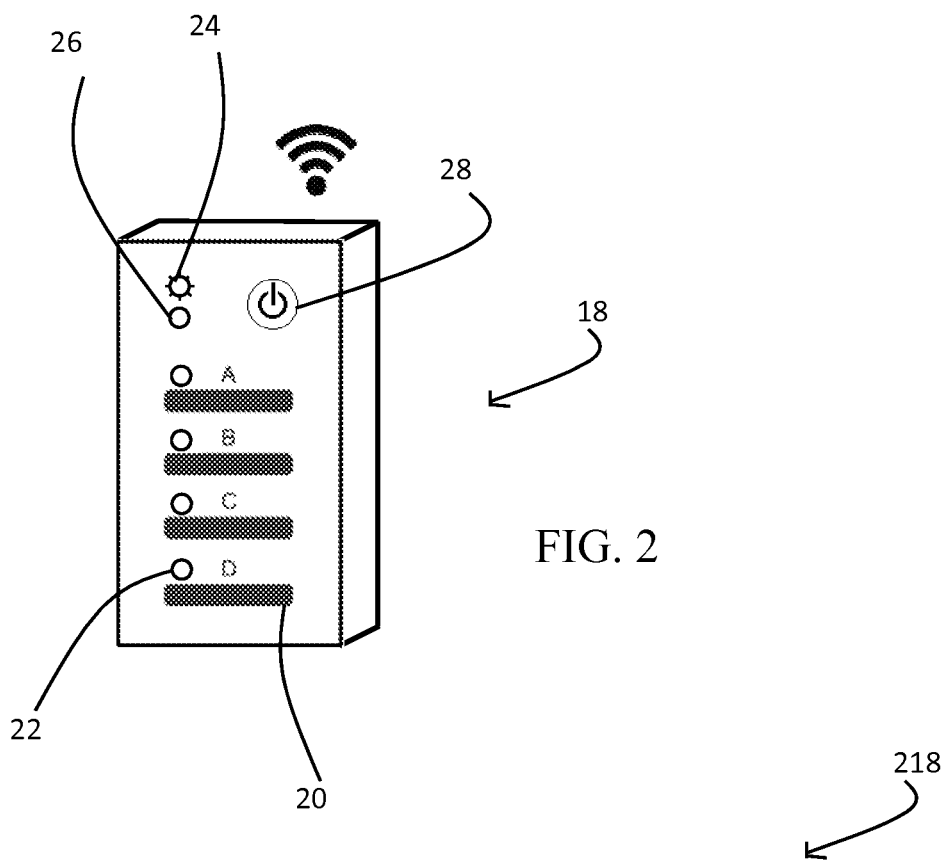
FIG. 2 illustrates a preferred embodiment of a remote input device of the audience response communication system.
Figure 3:
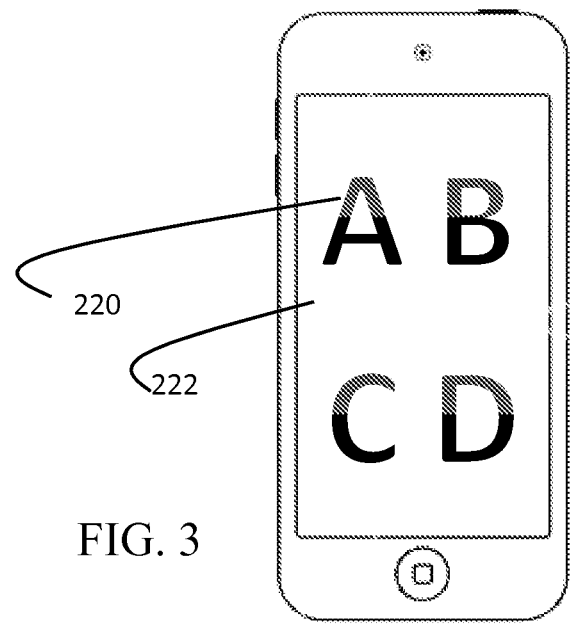
FIG. 3 illustrates an alternative preferred embodiment of a remote input device of the audience response communication system.

Two examples of remote input devices are shown in FIGS. 2 and 3. Referring to FIG. 2, a remote input unit 18 from FIG. 1 is shown. Each remote input device 18 is provided with a power button 28. Referring to FIG. 3, a smartphone or tablet computer based remote input unit is depicted. In this example, smartphone 218 is shown. Although not shown, the smartphone or tablet may include a separate attachable transceiver accessory. The particular smartphones or operating systems are within the discretion of the system provider. As shown, smartphone 218 displays on screen 222 a plurality of input options 220. The particular choices displayed may take any desired form. For example, rather than present letter choices to the user, number choices, pictographic choices, or full text answer choices may be presented. In a preferred embodiment, selection by a user of a particular choice will cause the display of that choice to change, e.g., change color, become highlighted, or the like, so as to indicate that it has been selected. It is contemplated that the audience response and communication system may include any combination of input devices, e.g., a combination of tablet computers, smartphones, and remote input units. The specific type of input device may include any type of device wherein the user may select from a plurality of input options, and the input device transmits selected input options to the base unit.

Each of the remote input devices further includes a processing unit. The processing unit is programmed to perform certain functions. A particular function relates to the sequential transmission of responses across multiple frequencies to avoid transmission interruptions. In the preferred embodiment described herein, the audience communication and response system operates within the 2.4 GHz frequency band. For example, it may be preferred that the system operates on sixteen frequencies within the 2.4 GHz frequency band, such as shown in the table below.

TABLE 1

| Channel | Frequency |
| --- | --- |
| 1 | 2.410 GHz |
| 2 | 2.415 GHz |
| 3 | 2.420 GHz |
| 4 | 2.425 GHz |
| 5 | 2.430 GHz |
| 6 | 2.435 GHz |
| 7 | 2.440 GHz |
| 8 | 2.445 GHz |
| 9 | 2.450 GHz |
| 10 | 2.455 GHz |

TABLE 1-continued

| Channel | Frequency |
|---|---|
| 11 | 2.460 GHz |
| 12 | 2.465 GHz |
| 13 | 2.470 GHz |
| 14 | 2.475 GHz |
| 15 | 2.480 GHz |
| 16 | 2.405 GHz |

Generally speaking, a voting or polling session with the audience response communication system involves a presenter or lecturer posing questions to the audience and eliciting votes. In the preferred embodiment, the presenter powers on the base unit, which begins listening on the aforementioned channels for a predetermined number, e.g., three, of "quiet" channels. According to the preferred embodiment, the processing unit of the base unit uses an algorithm discussed below to determine and select the best channels based on how quiet the different channels are. The base will then advertise to the remote input devices what the selected channels are via a beacon message. When a user votes with a remote input device, the unit will transmit the vote sequentially over the identified channels, e.g., channel 1, channel 2, channel 3. The unit will continue to cycle through the channels sequentially until a vote acknowledgement message is received by the remote input device. A more detailed description follows.

In a preferred embodiment, the radio receiver within the base unit provides a measurement of the 'quietness' of a channel, known as a Received Signal Strength Indication (RSSI) when the receiver is active. The RSSI is obtained for each of the channels used by the system. The processing unit of the base unit is programmed to use the RSSI data and calculate a continuous running average RSSI reading for each channel. This running average is calculated every frame for each frequency. During operation, these running averages are used to select "best channels." Other methods of determining 'quiet' channels as known in the art may be used. This cycle is repeated while the base unit is activated.

Figures 4, 5:
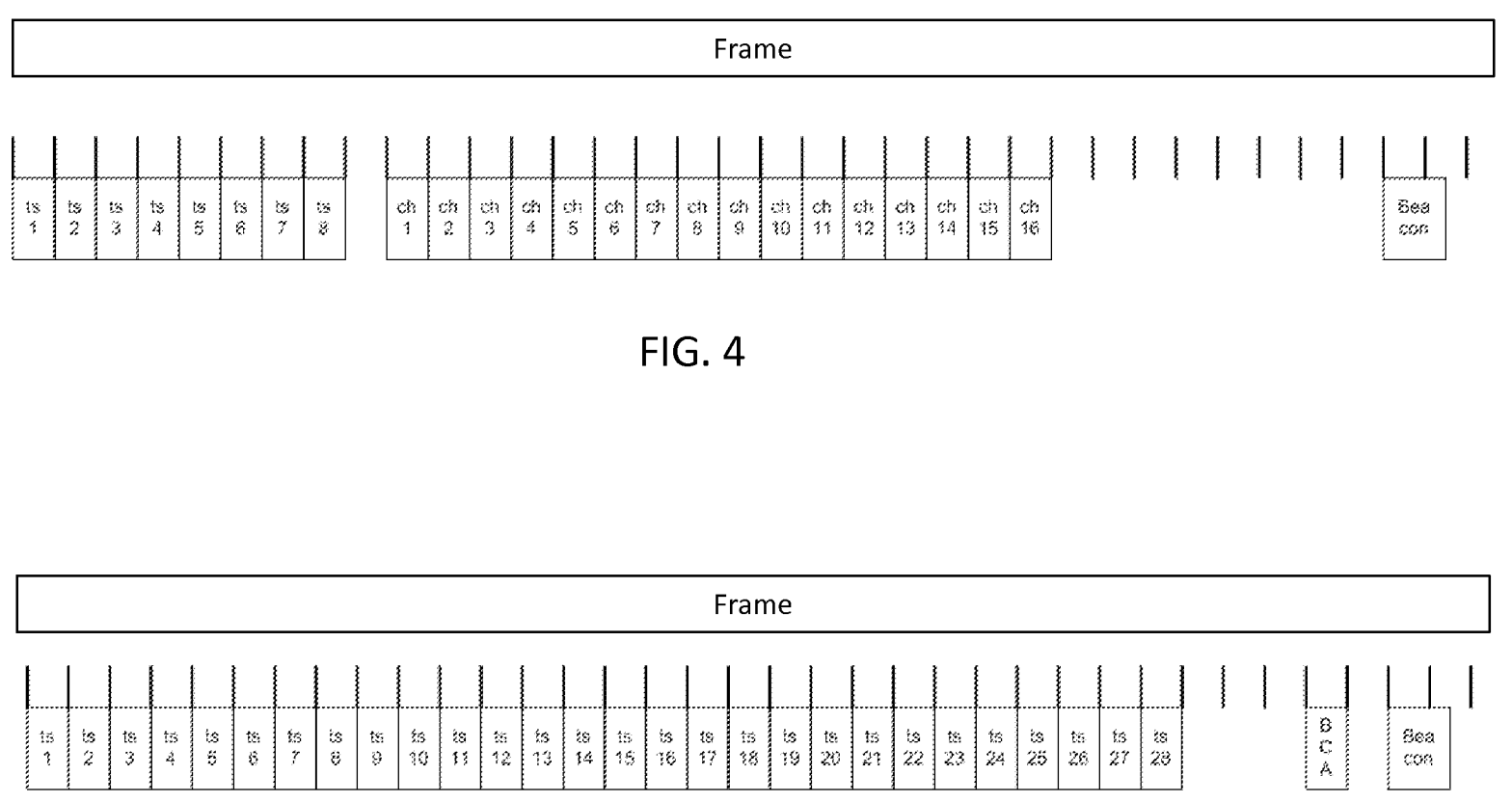

The preferred system will use a slotted ALOHA protocol with timing synchronized to beacon messages. Referring to FIG. 4, while the base is not receiving general votes from remote units, the base unit will listen for special instructor remote votes for a number of timeslots. The base unit will then listen on all designated channels once per message frame. A time slot is reserved for the base unit to transmit a beacon during each frame. This allows the base to periodically transmit current base status, as well as other information to any remotes that are in range.

Referring to FIG. 5, during user voting intervals, the frame is separated into several timeslots. In the slotted ALOHA protocol, each remote input device will randomly select a single timeslot to transmit a vote. Collisions due to transmission traffic are likely in heavy usage situations, but the slotted ALOHA protocol limits the effects of these collisions to a single timeslot. During user voting, the base unit may allocate a single timeslot to perform the assessment of the "quiet" or best channels. As shown in FIG. 6, the votes will be sent in frames on the best channels sequentially, in this example the best three channels. This means that the beacon in any given timeslot will initiate votes to be sent by the remote units on the next frequency in the next frame.

The remote unit will continue to re-transmit a vote message until it receives a vote acknowledgement message from the base unit that includes an indicator, such as an address, for that particular remote unit. For example, an acknowledgement may be sent by way of a dedicated acknowledgement signal, or more preferably incorporated into the next beacon in which case, the beacon will include, in the information transmitted, a vote acknowledgement message that is addressed to the remote units from which the base unit has received vote messages. In the preferred embodiment, the remote unit will continue to retransmit a vote message a number of times, with multiple cycles through the 3 "best" channels. As shown, the remote units transmit the vote message first via channel 1, then channel 2, then channel 3, and then repeats channels 1, 2, 3, etc. until an acknowledgement message is received as part of a beacon transmission, which is indicated as "B". Thus, in FIG. 6, the remote unit attempted transmission of the vote 5 times (an original transmission, and 4 re-transmissions) before receiving an acknowledgement. If no acknowledgement message is received by the remote unit, an error indicator, such as a red light, is activated. An acknowledgement message may not be received due to a failure in the transmission and re-transmission of the vote message, or may be the result of an incomplete transmission from the base unit of the acknowledgement message. The amount of time between a vote selection by a user and receipt of an error indicator will generally be considered inconsequential by a user. If an error indicator is generated by a remote input device, the user should have time during the polling period for a particular question to simply resubmit his or her vote, and the process is repeated.

Figure 7:
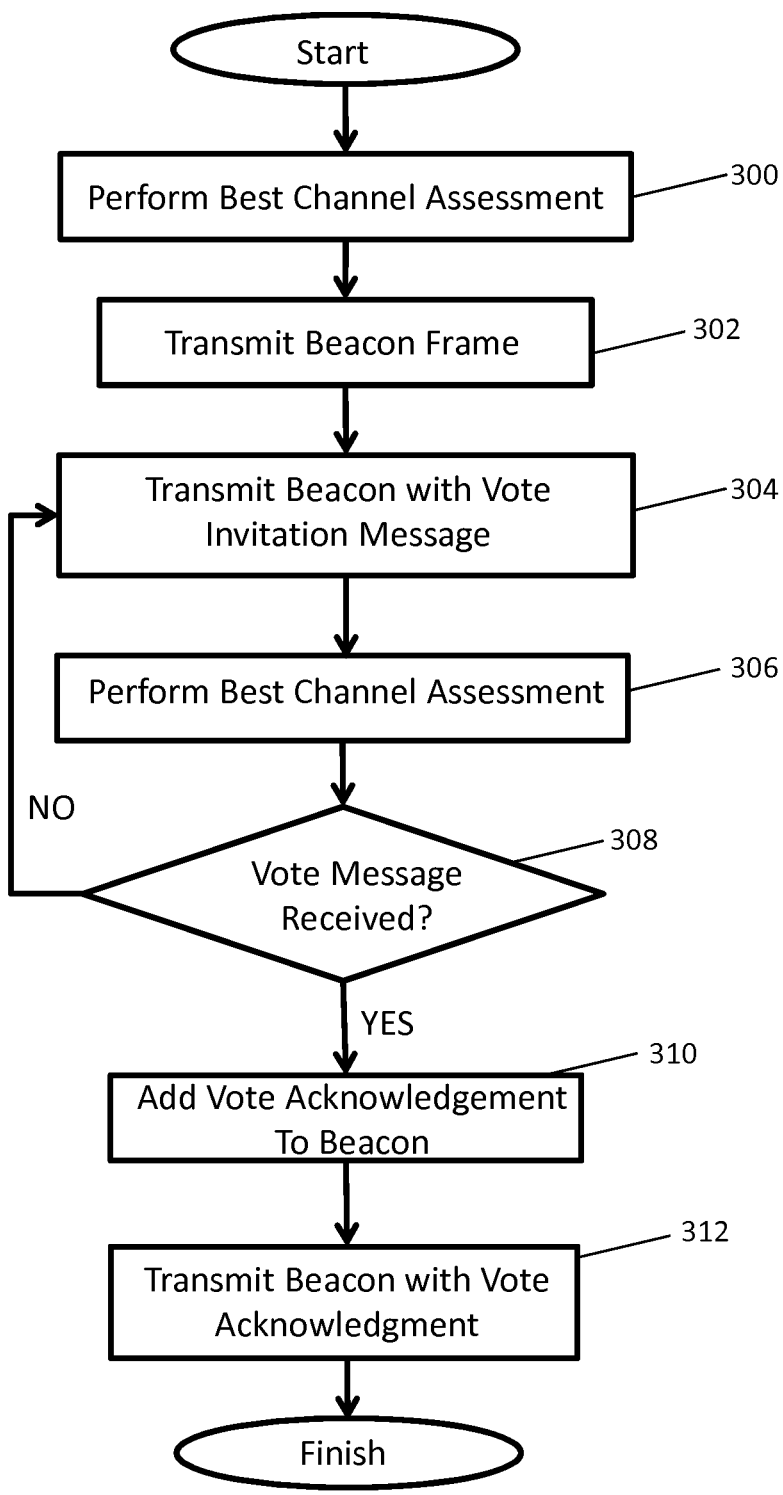
FIG. 7 depicts a flowchart of processes of the base unit.

Flowcharts illustrating the general functions of the base unit and the remote units performed as part of a single vote are provided as FIGS. 7 and 8. As shown in FIG. 7, after being powered on and performing an initiation processes, the base unit performs an assessment of the best channels for transmissions, as discussed above. (box 300). The base station then transmits a beacon to the plurality of remote units that syncs the remote units and the base unit. (box 302). After the presenter poses a question and a plurality of choices for response, the base unit transmits a vote invitation message, preferably via a beacon. (box 304). This vote invitation message includes information regarding the selected channels for transmission to the remote units.

The base station then, for each frame, conducts a best channel assessment. (box 306). To the extent that any vote messages are received by the base unit during a frame (box 308), a vote acknowledgement message is added to the beacon (box 310), and the beacon that is sent will also include a vote acknowledgement for the vote message that will be directed to the particular remote input device that transmitted the vote message. (box 312). Generation of the vote message by the remote input devices is discussed below.

As shown in FIG. 8, after being powered on, the remote units await a selection by the user of a vote or response. (box 402). After receiving a vote or response, the processing unit of the remote input device generates a vote message to be transmitted. (box 404). This vote message is temporarily stored in memory. (box 406). The remote unit then awaits a message from the base station indicating the selected channels over which to transmit. (box 408). This is preferably sent via a beacon. The remote unit then transmits the vote message over the first identified channel. (box 410). The remote unit then awaits an acknowledgement from the base unit, which is preferably included in a subsequent beacon. (box 412). If a beacon is received by the remote input device, the remote input device determines whether an acknowledgement is included. (box 414). If the beacon does not include an acknowledgement message for that particular remote input device, the remote unit will select the next channel for transmission (box 416), and re-transmit the vote message over the second identified channel. (box 418). When the next beacon is received, the remote input device will again determine if an acknowledgement is received. (box 420). In this example, where the number of channels selected is three, the remote unit again awaits an acknowledgement from the base unit. If a beacon is received by the remote input device, but it does not include an acknowledgement, the remote unit will re-transmit the vote message over the third identified channel. The remote unit will then wait again for an acknowledgement that the vote was received by the base unit. This process is repeated a predetermined number of times for each identified channel.

If no acknowledgement is received by the remote unit after the defined number of attempts, an error indicator is generated. For example, a red light may be illuminated, or a vibration signal activated.

It is understood that the exemplary system and method described herein and shown in the drawings represent only presently preferred embodiments of the invention. Various modifications and additions may be made to such embodiments without departing from the spirit and scope of the invention.

What is claimed is:

1. An audience response communication system, comprising:
   a base unit and a plurality of remote input devices; the base unit configured to select a set of quiet channels from a plurality of available channels and to transmit a vote invitation message to the plurality of remote input devices, the vote invitation message comprising an identifier tag and identification of the set of quiet channels, the base unit further adapted to transmit an acknowledgement message to at least one of the plurality of remote input devices after receipt of a vote message from the at least one of the plurality of remote input devices;
   each of the plurality of remote input devices configured to generate the vote message and to transmit the vote message across a first channel of the set of quiet channels after receiving the vote invitation message from the base unit, each of the plurality of the remote input devices further configured to re-transmit the vote message across a second channel of the set of quiet channels after receipt of a second vote invitation message if the vote acknowledgement is absent from the second vote invitation message.

2. The audience response communication system of claim 1, wherein each of the plurality of remote input devices is further configured to re-transmit the vote message across a third channel of the set of quiet channels after receipt of a third vote invitation message if the vote acknowledgement is absent from the third vote invitation message.

3. The audience response communication system of claim 2, wherein the third vote invitation message is a portion of a third beacon.

4. The audience response communication system of claim 1, wherein the first vote invitation message is a portion of a first beacon.

5. The audience response communication system of claim 1, wherein the second vote invitation message is a portion of a second beacon.

6. The audience response communication system of claim 1, wherein the base unit is adapted to periodically transmit vote invitation messages within a beacon, and where the plurality of remote input devices transmits the vote message sequentially via the set of quiet channels until the acknowledgement message is received or a predetermined number of re-transmissions has occurred.

7. The audience response system of claim 1, wherein the base station after transmitting a vote invitation message assesses the plurality of available channels to select a second set of quiet channels.

8. The audience response system of claim 1, wherein the base station selects the predetermined number of quiet channels by measuring the Received Signal Strength Indication of each of the plurality of channels.

9. The audience response system of claim 8 wherein the base station base calculates a continuous running average of the Received Signal Strength Indication reading for each channel.

10. An audience response communication system, comprising:
    a base unit and a plurality of remote input devices; and
    the base unit configured to assess the quietness of a plurality of available channels, to select a set of quiet channels and to periodically transmit a beacon receivable by each of the plurality of remote input devices, the beacon including a vote invitation message and identification of the set of quiet channels, the base unit further configured to include an acknowledgement message in the beacon addressed to at least one of the plurality of remote input devices after receiving a vote message from the at least one of the plurality of remote input devices;
    the at least one of the plurality of remote input devices configured to generate the vote message and store the vote message in memory, the at least one of the plurality of remote input devices further adapted to receive the beacon from the base unit and thereafter to transmit the vote message via a first channel of the set of quiet channels,
    the at least one of the remote input devices further configured to re-transmit the vote message across a second channel of the set of quiet channels upon receipt of a subsequent beacon when the subsequent beacon does not include the acknowledgement message addressed to the at least one of the remote input devices.

11. The audience response communication system of claim 10, wherein the at least one of the remote input devices further configured such that after receipt of a subsequent beacon that does not include the acknowledgement message addressed to the at least one of the remote input devices, the at least one of the remote input devices sequentially re-transmits the vote message across another member of the set of quiet channels.

12. The audience response system of claim 10, wherein the base station after transmitting a beacon including a vote invitation message re-assesses the quietness of the plurality of available transmission channels to select a second set of quiet transmission channels.

13. The audience response system of claim 10, wherein the base station assesses the quietness of each of the plurality of transmission channels by measuring the Received Signal Strength Indication.

14. The audience response system of claim 13 wherein the base station base calculates a continuous running average of the Received Signal Strength Indication reading for each channel.

15. An audience response communication system, comprising:
    a base unit and a plurality of remote input devices; and
    the base unit configured to assess the quietness of a plurality of available channels and to select a set of quiet channels, and to periodically transmit a beacon receivable by each of the plurality of remote input devices, the beacon including a vote invitation message and an identification of the set of quiet channels, at least one of the plurality of remote input devices configured to transmit a vote message addressed to the base unit after receiving the beacon, the vote message being transmitted via a first channel of the set of quiet channels;

the at least one of the plurality of remote input devices further configured to receive a first subsequent beacon and determine whether an acknowledgement message addressed to the at least one of the plurality of remote input devices is included in the first subsequent beacon;

the at least one of the plurality of remote input devices further configured to transmit the vote message via a second channel of the set of quiet channels if the at least one of the plurality of remote input devices determines the first subsequent beacon does not include the acknowledgement message addressed to the at least one of the plurality of remote input devices.

16. The audience response communication system of claim 15, wherein the at least one of the remote input devices is further configured to transmit the vote message via a third channel of the set of quiet channels if the at least one of the plurality of remote input devices determines a second subsequent beacon does not include the acknowledgement message addressed to the at least one of the plurality of remote input devices.

17. The audience response communication system of claim 16, wherein the at least one of the remote input devices is adapted to sequentially re-transmit the vote message via the first, second, and third channels a predetermined number of attempts, and to generate an error indicator if the at least one of the remote input devices does not receive an acknowledgement message after the predetermined number of attempts.

18. The audience response system of claim 15, wherein the base station after transmitting a beacon including a vote invitation message re-assesses the quietness of the plurality of available transmission channels to select a second set of quiet transmission channels.

19. The audience response system of claim 15, wherein the base station assesses the quietness of each of the plurality of transmission channels by measuring the Received Signal Strength Indication.

20. The audience response system of claim 19 wherein the base station base calculates a continuous running average of the Received Signal Strength Indication reading for each channel.

* * * * *